(12) United States Patent
Radi et al.

(10) Patent No.: US 12,386,648 B2
(45) Date of Patent: Aug. 12, 2025

(54) RESOURCE ALLOCATION IN VIRTUALIZED ENVIRONMENTS

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 577 days.

(21) Appl. No.: 17/836,927

(22) Filed: Jun. 9, 2022

(65) Prior Publication Data

US 2023/0401079 A1 Dec. 14, 2023

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,381,686 B1 | 4/2002 | Imamura | |
| 8,412,907 B1 | 4/2013 | Dunshea et al. | |
| 8,700,727 B1 | 4/2014 | Gole et al. | |
| 10,027,697 B1 | 7/2018 | Babun et al. | |
| 10,362,149 B2 | 7/2019 | Biederman et al. | |
| 10,530,711 B2 | 1/2020 | Yu et al. | |
| 10,628,560 B1 | 4/2020 | Siranni et al. | |
| 10,706,147 B1 | 7/2020 | Pohlack | |

(Continued)

FOREIGN PATENT DOCUMENTS

| | | |
|---|---|---|
| CN | 106603409 A | 4/2017 |
| CN | 112351250 A | 2/2021 |

(Continued)

OTHER PUBLICATIONS

Maefeichen.com; "Setup the extended Berkeley Packet Filter (eBPF) Environment"; Maofei's Blog; Dec. 9, 2021; available at: https://maofeichen.com/setup-the-extended-berkeley-packet-filter-ebpf-environment/.

(Continued)

*Primary Examiner* — Adam Lee
(74) *Attorney, Agent, or Firm* — Barry IP Law, P.C.

(57) ABSTRACT

A node includes a shared memory for a distributed memory system. A Virtual Switch (VS) controller establishes different flows of packets between at least one Virtual Machine (VM) running at the node and one or more other VMs running at the node or at another node. Requests to access the shared memory are queued in submission queues in a kernel space and processed requests are queued in completion queues in the kernel space. Indications of queue occupancy are determined for at least one queue and one or more memory request rates are set for at least one application based at least in part on the determined indications of queue occupancy. In another aspect, flow metadata is generated for each flow and at least one of the set one or more respective memory request rates and one or more respective resource allocations is adjusted for the at least one application.

20 Claims, 4 Drawing Sheets

(56) References Cited

U.S. PATENT DOCUMENTS

| | | | |
|---|---|---|---|
| 10,754,707 | B2 | 8/2020 | Tamir et al. |
| 10,757,021 | B2 | 8/2020 | Man et al. |
| 11,134,025 | B2 | 9/2021 | Billore et al. |
| 11,223,579 | B2 | 1/2022 | Lu |
| 2002/0143843 | A1 | 10/2002 | Mehta |
| 2005/0257263 | A1 | 11/2005 | Keohane et al. |
| 2006/0101466 | A1 | 5/2006 | Kawachiya et al. |
| 2007/0067840 | A1 | 3/2007 | Young |
| 2009/0249357 | A1 | 10/2009 | Chanda et al. |
| 2010/0161976 | A1 | 6/2010 | Bacher |
| 2011/0126269 | A1* | 5/2011 | Youngworth ......... G06F 3/0664 718/1 |
| 2012/0198192 | A1 | 8/2012 | Balasubramanian et al. |
| 2012/0207026 | A1 | 8/2012 | Sato |
| 2014/0143365 | A1 | 5/2014 | Guerin et al. |
| 2014/0283058 | A1 | 9/2014 | Gupta |
| 2015/0006663 | A1 | 1/2015 | Huang |
| 2015/0319237 | A1 | 11/2015 | Hussain et al. |
| 2015/0331622 | A1 | 11/2015 | Chiu et al. |
| 2017/0163479 | A1 | 6/2017 | Wang et al. |
| 2017/0269991 | A1 | 9/2017 | Bazarsky et al. |
| 2018/0004456 | A1 | 1/2018 | Talwar et al. |
| 2018/0012020 | A1 | 1/2018 | Prvulovic et al. |
| 2018/0032423 | A1 | 2/2018 | Bull et al. |
| 2018/0060136 | A1 | 3/2018 | Herdrich et al. |
| 2018/0173555 | A1 | 6/2018 | Lutas |
| 2018/0191632 | A1 | 7/2018 | Biederman et al. |
| 2018/0341419 | A1 | 11/2018 | Wang et al. |
| 2018/0357176 | A1 | 12/2018 | Wang |
| 2019/0227936 | A1 | 7/2019 | Jang |
| 2019/0280964 | A1 | 9/2019 | Michael et al. |
| 2020/0034538 | A1 | 1/2020 | Woodward et al. |
| 2020/0201775 | A1 | 6/2020 | Zhang et al. |
| 2020/0274952 | A1 | 8/2020 | Waskiewicz et al. |
| 2020/0285591 | A1 | 9/2020 | Luo et al. |
| 2020/0322287 | A1 | 10/2020 | Connor et al. |
| 2020/0403905 | A1 | 12/2020 | Allen et al. |
| 2020/0409821 | A1 | 12/2020 | Terada et al. |
| 2021/0019197 | A1 | 1/2021 | Tamir et al. |
| 2021/0058424 | A1 | 2/2021 | Chang et al. |
| 2021/0103505 | A1* | 4/2021 | Tsuchiya ............... G06F 11/076 |
| 2021/0149763 | A1 | 5/2021 | Ranganathan et al. |
| 2021/0157740 | A1 | 5/2021 | Benhanokh et al. |
| 2021/0240621 | A1 | 8/2021 | Fu et al. |
| 2021/0266253 | A1 | 8/2021 | He et al. |
| 2021/0320881 | A1 | 10/2021 | Coyle et al. |
| 2021/0377150 | A1 | 12/2021 | Dugast et al. |
| 2022/0035698 | A1 | 2/2022 | Vankamamidi et al. |
| 2022/0121362 | A1 | 4/2022 | Liu et al. |
| 2022/0294883 | A1 | 9/2022 | Pope et al. |
| 2022/0350516 | A1 | 11/2022 | Bono et al. |
| 2022/0357886 | A1 | 11/2022 | Pitchumani et al. |
| 2022/0414968 | A1 | 12/2022 | Wiegert et al. |

FOREIGN PATENT DOCUMENTS

| | | |
|---|---|---|
| EP | 3358456 A1 | 8/2018 |
| EP | 3598309 B1 | 5/2022 |
| KR | 1020190090331 A | 8/2019 |
| WO | 2018086569 A1 | 5/2018 |
| WO | 2018145725 A1 | 8/2018 |
| WO | 2021226948 A1 | 11/2021 |

OTHER PUBLICATIONS

International Search Report and Written Opinion dated Oct. 25, 2022 from International Application No. PCT/ US2022/030414, 11 pages.

Sabella et al.; "Using eBPF for network traffic analysis"; available at: Year: 2018; https://www.ntop.org/wp-content/uploads/2018/10/Sabella.pdf.

Bachl et al.; "A flow-based IDS using Machine Learning in EBPF"; Cornell University; Feb. 19, 2021; available at https://arxiv.org/abs/2102.09980.

Caviglione et al.; "Kernel-level tracing for detecting stegomalware and covert channels in Linux environments"; Computer Networks 191; Mar. 2021; available at: https://www.researchgate.net/publication/350182568_Kernel-level_tracing_for_detecting_stegomalware_and_covert_channels_in_Linux_environments.

Dimolianis et al.; "Signature-Based Traffic Classification and Mitigation for DDOS Attacks Using Programmable Network Data Planes"; IEEE Access; Jul. 7, 2021; available at: https://ieeexplore.ieee.org/stamp/stamp.jsp?amumber-9511420.

Jun Li; "Efficient Erasure Coding In Distributed Storage Systems"; A thesis submitted in conformity with the requirements for the degree of Doctor of Philosophy Graduate Department of Electrical and Computer Engineering, University of Toronto; Nov. 2017; available at: https://tspace.library.utoronto.ca/bitstream/1807/80700/1/Li_Jun_201711_PhD_thesis.pdf.

Lakshmi J. Mohan; "Erasure codes for optimal performance in geographically distributed storage systems"; Apr. 2018; School of Computing and Information Systems, University of Melbourne; available at: https://minerva-access.unimelb.edu.au/handle/11343/215919.

Navarre et al.; "SRv6-FEC: Bringing Forward Erasure Correction to IPv6 Segment Routing"; SIGCOMM '21: Proceedings of the SIGCOMM '21 Poster and Demo Sessions; Aug. 2021; pp. 45-47; available at: https://dl.acm.org/doi/10.1145/3472716.3472863.

Van Schaik et al.; "RIDL: Rogue In-Flight Data Load"; Proceedings—IEEE Symposium on Security and Privacy; May 2019; available at: https://mdsattacks.com/files/ridl.pdf.

Xhonneux et al.; "Flexible failure detection and fast reroute using eBPF and SRv6"; 2018 14th International Conference on Network and Service Management (CNSM); Nov. 2018; available at: https://dl.ifip.org/db/conf/cnsm/cnsm2018/1570493610.pdf.

Zhong et al.; "Revisiting Swapping in User-space with Lightweight Threading"; arXiv:2107.13848v1; Jul. 29, 2021; available at: https://deepai.org/publication/revisiting-swapping-in-user-space-with-lightweight-threading.

Baidya et al.; "eBPF-based Content and Computation-aware Communication for Real-time Edge Computing"; IEEE International Conference on Computer Communications (INFOCOM Workshops); May 8, 2018; available at https://arxiv.org/abs/1805.02797.

Barbalace et al.; "blockNDP: Block-storage Near Data Processing"; University of Edinburgh, Huawei Dresden Research Center, Huawei Munich Research Center, TUM; Dec. 2020; 8 pages; available at https://dl.acm.org/doi/10.1145/3429357.3430519.

Blin et al.; "Toward an in-kernel high performance key-value store implementation"; Oct. 2019; 38th Symposium on Reliable Distributed Systems (SRDS); available at: https://ieeexplore.ieee.org/document/9049596.

Enberg et al.; "Partition-Aware Packet Steering Using XDP and eBPF for Improving Application-Level Parallelism"; ENCP; Dec. 9, 2019; 7 pages; available at: https://penberg.org/papers/xdp-steering-encp19.pdf.

Kicinski et al.; "eBPF Hardware Offload to SmartNICs: cls_bpf and XDP"; Netronome Systems Cambridge, United Kingdom; 2016; 6 pages; available at https://www.netronome.com/media/documents/eBPF_HW_OFFLOAD_HNiMne8_2_.pdf.

Kourtis et al.; "Safe and Efficient Remote Application Code Execution on Disaggregated NVM Storage with eBPF"; Feb. 25, 2020; 8 pages; available at https://arxiv.org/abs/2002.11528.

Wu et al.; "BPF for storage: an exokernel-inspired approach"; Columbia University, University of Utah, VMware Research; Feb. 25, 2021; 8 pages; available at: https://sigops.org/s/conferences/hotos/2021/papers/hotos21-s07-zhong.pdf.

Pending U.S. Appl. No. 17/561,898, filed Dec. 24, 2021, entitled "In-Kernel Caching for Distributed Cache", Marjan Radi.

Pending U.S. Appl. No. 17/571,922, filed Jan. 10, 2022, entitled "Computational Acceleration for Distributed Cache", Marjan Radi.

Pending U.S. Appl. No. 17/665,330, filed Feb. 4, 2022, entitled "Error Detection and Data Recovery for Distributed Cache", Marjan Radi.

(56) References Cited

OTHER PUBLICATIONS

Pending U.S. Appl. No. 17/683,737, filed Mar. 1, 2022, entitled "Detection of Malicious Operations for Distributed Cache", Marjan Radi.
Pending U.S. Appl. No. 17/741,244, filed May 10, 2022, entitled "In-Kernel Cache Request Queuing for Distributed Cache", Marjan Radi.
Tu et al.; "Bringing the Power of eBPF to Open vSwitch"; Linux Plumber 2018; available at: http://vger.kernel.org/lpc_net2018_talks/ovs-ebpf-afxdp.pdf.
Pending U.S. Appl. No. 17/829,712, filed Jun. 1, 2022, entitled "Context-Aware NVMe Processing in Virtualized Environments", Marjan Radi.
International Search Report and Written Opinion dated Nov. 18, 2022 from International Application No. PCT/US2022/030437, 10 pages.
Kang et al.; "Enabling Cost-effective Data Processing with Smart SSD"; 2013 IEEE 29th Symposium on Mass Storage Systems and Technologies (MSST); available at: https://pages.cs.wisc.edu/~yxy/cs839-s20/papers/SmartSSD2.pdf.
Bijlani et al.; "Extension Framework for File Systems in User space"; Jul. 2019; Usenix; available at: https://www.usenix.org/conference/atc19/presentation/bijlani.
Brad Fitzpatrick; "Distributed Caching with Memcached"; Aug. 1, 2004; Linux Journal; available at: https://www.linuxjournal.com/article/7451.
Roderick W. Smith; "The Definitive Guide to Samba 3"; 2004; APress Media; pp. 332-336; available at: https://link.springer.com/book/10.1007/978-1-4302-0683-5.
Wu et al.; "NCA: Accelerating Network Caching with express Data Path"; Nov. 2021; IEEE; available at https://ieeexplore.ieee.org/abstract/document/9680837.
Patterson et al.; "Computer Architecture: A Quantitative Approach"; 1996; Morgan Kaufmann; 2nd ed.; pp. 378-380.
Pending U.S. Appl. No. 17/850,767, filed Jun. 27, 2022, entitled "Memory Coherence in Virtualized Environments", Marjan Radi.
Gao et al.; "OVS-CAB: Efficient rule-caching for Open vSwitch hardware offloading"; Computer Networks; Apr. 2021; available at:https://www.sciencedirect.com/science/article/abs/pii/S1389128621000244.
Pfaff et al.; "The Design and Implementation of Open vSwitch"; Usenix; May 4, 2015; available at: https://www.usenix.org/conference/nsdi15/technical-sessions/presentation/pfaff.
Ghigoff et al., "BMC: Accelerating Memcached using Safe In-kernel Caching and Pre-stack Processing"; In: 18th USENIX Symposium on Networked Systems Design and Implementation (NSDI 2021); p. 487-501; Apr. 14, 2021.
International Search Report and Written Opinion dated Sep. 30, 2022 from International Application No. PCT/US2022/029527, 9 pages.
Anderson et al.; "Assise: Performance and Availability via Client-local NVM in a Distributed File System"; the 14th USENIX Symposium on Operating Systems Design and Implementation; Nov. 6, 2020; available at: https://www.usenix.org/conference/osdi20/presentation/anderson.
Pinto et al.; "Hoard: A Distributed Data Caching System to Accelerate Deep Learning Training on the Cloud"; arXiv; Dec. 3, 2018; available at: https://arxiv.org/pdf/1812.00669.pdf.
International Search Report and Written Opinion dated Oct. 7, 2022 from International Application No. PCT/US2022/030044, 10 pages.

* cited by examiner

RESOURCE ALLOCATION IN VIRTUALIZED ENVIRONMENTS

CROSS-REFERENCE TO RELATED APPLICATIONS

This application is related to U.S. application Ser. No. 17/561,898 titled "IN-KERNEL CACHING FOR DISTRIBUTED CACHE", filed on Dec. 24, 2021, which is hereby incorporated by reference in its entirety. This application is also related to U.S. application Ser. No. 17/571,922 titled "COMPUTATIONAL ACCELERATION FOR DISTRIBUTED CACHE", filed on Jan. 10, 2022, which is hereby incorporated by reference in its entirety. This application is also related to U.S. application Ser. No. 17/665,330 titled "ERROR DETECTION AND RECOVERY FOR DISTRIBUTED CACHE", filed on Feb. 4, 2022, which is hereby incorporated by reference in its entirety. This application is also related to U.S. application Ser. No. 17/683,737 titled "DETECTION OF MALICIOUS OPERATIONS FOR DISTRIBUTED CACHE", filed on Mar. 1, 2022, which is hereby incorporated by reference in its entirety. This application is also related to U.S. application Ser. No. 17/741,244 titled "IN-KERNEL CACHE REQUEST QUEUING FOR DISTRIBUTED CACHE", filed on May 10, 2022, which is hereby incorporated by reference in its entirety. This application is also related to U.S. application Ser. No. 17/829,712 titled "CONTEXT-AWARE NVMe PROCESSING IN VIRTUALIZED ENVIRONMENTS", filed on Jun. 1, 2022, which is hereby incorporated by reference in its entirety.

BACKGROUND

Current trends in cloud computing, big data, and Input/Output (I/O) intensive applications have led to greater needs for high performance distributed shared memory systems in terms of low latency, high throughput, and bandwidth. In addition, the growth of real-time and interactive big data applications relies on fast and high-performance memory. Non-Volatile Memory express (NVMe®) is an emerging host controller interface originally designed for Peripheral Component Interface express (PCIe)-based Solid State Drives (SSDs) to provide increased performance in terms of Input/Output Operations Per Second (IOPS). Due to the superior performance of NVMe technology in terms of latency and bandwidth, it is becoming the new industry standard for both client devices and data center servers.

In addition, virtual network switching and network function virtualization, such as software switching, can improve distributed memory configuration, flexibility, and scalability, while reducing system cost. Although software switching, such as Open vSwitch (OVS), can reduce packet processing latency, such software switching does not consider the resource allocation among applications to meet varying resource requirements for different applications and to provide fair resource sharing among the applications. In this regard, there are still performance bottlenecks that prevent taking full advantage of NVMe and NVMe over Fabric (NVMe-oF™) performance in virtual environments.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Network Environments

Figure 1:
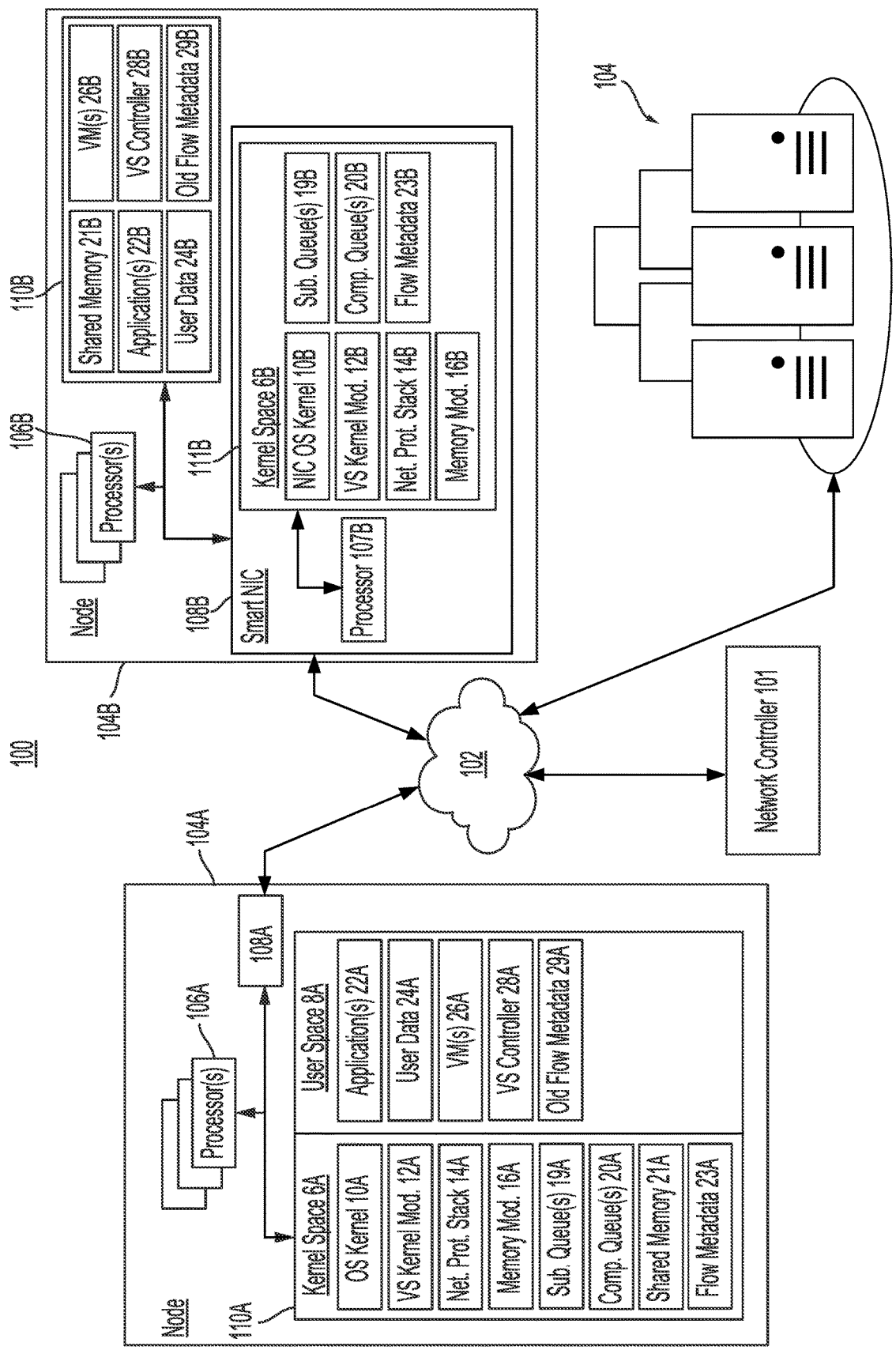
FIG. 1 is a block diagram of an example network environment for implementing virtualized Non-Volatile Memory express (NVMe) resource allocation according to one or more embodiments.

FIG. 1 illustrates an example network environment 100 for implementing virtualized Non-Volatile Memory express (NVMe) resource allocation according to one or more embodiments. As shown in FIG. 1, nodes 104 communicate with each other via network 102. Nodes 104 may function as, for example, servers or processing nodes and/or memory nodes. As a processing node or compute node, a node 104 can include one or more processors 106, such as Reduced Instruction Set Computer (RISC)-V cores or other type of Central Processing Unit (CPU) to process data, such as for a distributed application. As a memory node, a node 104 provides a shared memory that may be accessed by other nodes in network 102 and form part of a distributed memory system shared among nodes in network 102.

In some cases, some of nodes 104 may function as, for example, storage nodes that store data that can be accessed by nodes 104 and stored locally in a shared memory that forms part of the distributed memory system. In this regard, some of nodes 104 can include, for example, one or more rotating magnetic disks, and/or non-volatile solid-state memory, such as flash memory. In some implementations, a single node 104 may include one or more Solid-State Drives (SSDs) and/or Hard Disk Drives (HDDs). As discussed in more detail below, data retrieved from nodes or processed by nodes 104 can be cached or stored in respective shared memories 21 at nodes 104 that form the distributed memory to provide faster access to data as compared to retrieving data from storage devices of remote and/or local nodes 104.

In some implementations, network environment 100 in FIG. 1 may be used as at least part of a data center and/or for distributed processing, such as for distributed machine learning or big data analysis. As will be appreciated by those of ordinary skill in the art, nodes 104 are shown for the purposes of illustration, and network environment 100 can include many more nodes 104 than those shown in FIG. 1. In addition, those of ordinary skill the art will appreciate that network environment 100 can include more components than shown in FIG. 1, such as aggregated switches, Top of Rack (ToR) switches, and additional network controllers, for example.

Network 102 can include, for example, a Storage Area Network (SAN), a Local Area Network (LAN), and/or a Wide Area Network (WAN), such as the Internet. In this regard, nodes 104 may not be in the same geographic location. Nodes 104 may communicate using one or more standards such as, for example, Ethernet.

Each of nodes 104A and 104B in the example of FIG. 1 includes one or more processors 106, a network interface 108, and a memory 110. These components of nodes 104 may communicate with each other via a bus, which can include, for example, a Peripheral Component Interconnect express (PCIe) bus. In some implementations, nodes 104 may include NVMe over Fabric (NVMe-oF) nodes that are configured to communicate with other nodes 104 using NVMe messages (e.g., NVMe commands and responses) that may be, for example, encapsulated in Ethernet packets using Transmission Control Protocol (TCP). In this regard, network interfaces 108A and 108B of nodes 104A and 104B, respectively, may include Network Interface Cards (NICs), network interface controllers, or network adapters.

In the example of FIG. 1, node 104B includes smart NIC 108B as its network interface. As discussed in more detail below, smart NIC 108B includes its own processor 107B and memory 111B that can be used for generating flow metadata for different flows of packets between Virtual Machines (VMs) and/or for providing queue occupancy indications for requests to access shared memory 21B. This arrangement can improve the performance of node 104B by offloading such operations from a processor 106B of node 104B to smart NIC 108B. In some implementations, smart NIC 108B may also serve as an NVMe controller for controlling operation of memory 110B, which can be an NVMe device.

Processors 106 and 107B in FIG. 1 can execute instructions, such as instructions from one or more user space applications (e.g., applications 22) loaded from memory 110 or 111B, or from an Operating System (OS) kernel 10. Processors 106 and 107B can include circuitry such as, for example, a CPU, a Graphics Processing Unit (GPU), a microcontroller, a Digital Signal Processor (DSP), an Application-Specific Integrated Circuit (ASIC), a Field Programmable Gate Array (FPGA), one or more RISC-V cores, hard-wired logic, analog circuitry and/or a combination thereof. In some implementations, processors 106 and 107B can include a System on a Chip (SoC), which may be combined with a memory 110 or 111B, respectively.

Memories 110 and 111B can include, for example, a volatile Random Access Memory (RAM) such as Static RAM (SRAM), Dynamic RAM (DRAM), or a non-volatile RAM, or other solid-state memory that is used by processors 106 or 107B. Data stored in memory 110 or memory 111B can include data read from another node 104, data to be stored in another node 104, instructions loaded from an application or from an OS for execution by the processor, and/or data used in executing such applications, such as user data 24.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof. In other implementations, memory 110 or 111B may include a Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

Memory 110A of node 104A includes a kernel space 6A that is used by OS kernel 10A and a user space 8A that is used by one or more user space applications 22A, one or more Virtual Machines (VMs) 26A, and Virtual Switching (VS) controller 28A. Kernel space 6A and user space 8A can include separate portions of virtual memory mapped to physical addresses in memory 110A. As will be understood by those of ordinary skill in the art, access to kernel space 6A is generally restricted to OS kernel 10A, its kernel extensions, and other portions of an OS, such as device drivers, while access to user space 8A is available to applications 22A, VMs 26A, and VS controller 28A, in addition to the OS. In this regard, the OS of node 104A or the OS of smart NIC 108B allocates hardware and software resources, such as memory, network, and processing resources of the device. In addition, and as discussed in more detail below, VS controllers 28 in a user space can allocate resources for different applications, such as by setting memory request rates for the applications.

As shown in FIG. 1, kernel space 6A includes OS kernel 10A, VS kernel module 12A, network protocol stack 14A, memory module 16A, one or more submission queues 19A, one or more completion queues 20A, shared memory 21A, and flow metadata 23A. In implementations where the OS of node 104A is Linux®, memory module 16A can include an extended Berkeley Packet Filter (eBPF) program executed as an extension of the Linux kernel (Linux® is the registered trademark of Linus Torvalds in the U.S. and other countries). Notably, eBPF can enable reprogramming of the kernel behavior without requiring changes to the kernel source code or loading a kernel module. In addition, eBPF includes a verifier to ensure safe execution of eBPF programs. In some implementations, certain functions of VS kernel module 12A, such as generating flow metadata and/or determining submission and completion queue occupancies, can be performed by an eBPF program attached to VS kernel module 12A.

VS kernel module 12A can be used by the kernel to handle requests received from VMs 26A in user space 8A to communicate with other VMs either locally at node 104A or at a different node, such as node 104B. In some implementations, VS kernel module 12A can include an Open vSwitch (OVS) kernel module and can provide a programmable or customizable configuration in the way packets are processed or for generating flow metadata. In other implementations, the flow metadata generation can be accomplished with a separate module or program in the kernel space, such as an eBPF program attached to VS kernel module 12A.

As a virtual switch, VS kernel module 12A can use flow tables (e.g., match-action tables) and perform table lookup operations in kernel space 6A for requests received from VMs to identify a corresponding socket or port to send a packet for a request. The VS kernel module in the kernel can process packets in a kernel data path, and if the VS kernel module cannot find a match in its flow tables, the kernel path can pass the packet to the VS controller in the user space to process a new flow. The user space VS controller can then update the VS kernel module's data path tables so that subsequent packets for the flow can be processed in the kernel for faster processing.

In some implementations, VS controller 28A can include an OVS controller or agent that can provide a programmable or customizable configuration for setting memory request rates and/or allocating resources of the node. In other implementations, this can be accomplished with a separate program in the user space.

In node 104A, VS kernel module 12A can determine one or more respective indications of queue occupancy for submission queues 19A and completion queues 20A. Submission queues 19A can include requests, such as NVMe requests, to access data in shared memory 21A, such as read commands or write commands. Each of the submission queues correspond to a different user space application that originated the requests to access shared memory 21A. Completion queues 20A can include processed requests, such as data returned from read requests or write confirmations for data written in shared memory 21A.

VS kernel module 12A has access to these queues in kernel space 6A and can determine an indication of queue occupancy for one or more of the queues. The indication of queue occupancy can include, for example, a number of pending requests in the queue or a level of queue occupancy, such as an indication that the number of requests in the queue are greater than a threshold number of requests. As discussed in more detail below, VS kernel module 12A can provide the indications of queue occupancy to VS controller 28A in user space 8A. Since the submission queues are sorted by the requesting user space application, the queue occupancies can provide an indication of the relative usage of shared memory 21A by the different user space applications. The completion queues 20A may also be sorted by user space application so that the queue occupancy of the completion queues 20A provide additional information about recent usage of the shared memory 21A by the different applications. In other implementations, there may only be a single completion queue 20A or completion queues 20A that are sorted by processed read requests and processed write requests instead of by user space application. In such implementations, the indications of queue occupancies for such completion queues 20A can indicate an overall usage of shared memory 21A or a relative indication of usage for read requests versus write requests.

VS controller 28A can then use the indications of queue occupancy to set one or more respective memory request rates for at least one application running on one or more VMs 26A. The memory request rates can be set by VS controller 28A to better balance usage of shared memory 21A among the different user space applications and/or to lower or increase an overall memory request rate based on an overall indication of queue occupancy for all the user space applications. In some cases, such balancing of the usage of shared memory 21A can prevent one user space application with frequent memory requests from effectively blocking access to the shared memory by other user space applications.

In addition, VS kernel module 12A can generate flow metadata for the different flows of packets and store the flow metadata as flow metadata 23A in kernel space 6A. The flow metadata can represent, for example, at least one of a read request frequency of requests to read data from shared memory 21A, a write request frequency of requests to write data in shared memory 21A, a read to write ratio of reading data from shared memory 21A to writing data in shared memory 21A, a usage of an amount of shared memory 21A, a usage of at least one processor of node 104A, a packet reception rate of node 104A, and at least one indication of queue occupancy for a corresponding submission queue 19A and a corresponding completion queue 20A for requests from the flow of packets. As discussed in more detail below, VS kernel module 12A can provide the flow metadata to VS controller 28A in user space 8A to adjust at least one of one or more respective memory request rates and one or more respective resource allocations for at least one user space application running on one or more VMs 26A.

The resource allocations adjusted by VS controller 28A can include, for example, a scheduling for tasks of the application on a VM 26A, a number of submission queues 19A for the application to access shared memory 21A, a dequeuing frequency or number of requests dequeued for the application from one or more submission queues 19A, or a network bandwidth allocated to the application, such as with the allocation of one or more VS packet queues for the application or a dequeuing policy for such queues.

VS controller 28A may also store old flow metadata 29A in user space 8A that represents previous usage of at least one resource of node 104A, such as a processor usage or usage of shared memory 21A, by one or more previous flows of packets. Old flow metadata 29A can be used to estimate a future resource utilization of at least one application. For example, an indication of a previous processor usage and/or memory usage by an application 22A may be included in old flow metadata 29A. In response to the same application 22A becoming active again, VS controller 28A may consider the application's previous usage in adjusting one or more memory request rates and/or respective resource allocations for one or more running applications.

In some implementations, VS kernel module 12A may use the transport and application layers of network protocol stack 14B to add at least one of a congestion indicator and a memory request rate set by VS controller 28A to one or more packets of at least one flow of packets. The congestion indicator can include, for example, a value in a field in the packet to indicate an overall queue occupancy for submission queues 19A and/or completion queues 20A, a packet reception rate of node 104A, and/or an average processing time for requests received by node 104A. The other node 104 may use this information and/or the memory request rate set for its user space application by VS controller 28A to adjust its memory request rate for shared memory 21A.

In other implementations, a program, such as an eBPF program in kernel space 6A can be attached to VS kernel module 12A to add the congestion indicator and/or the set memory request rate for one or more packets in the flow of packets. The one or more packets may then be sent to a VM executed by node 104A or by another node 104 in network 102 to adjust the memory request rate of a user space application running on the VM.

In another aspect, VS kernel module 12A or a program attached to VS kernel module 12A can add at least part of the flow metadata for a flow of packets to one or more packets in the flow that are sent to at least one of another node in network 102 and network controller 101, which can include a Software Defined Networking (SDN) controller in some implementations. The flow metadata may then be collected by network controller 101 to adjust resource usage by one or more nodes 104 or applications executing at the node, such as a packet transmission rate or a memory request rate. Network controller 101 can adjust the resource usage of the node or nodes based on a global demand for accessing the distributed memory system and bottlenecks in network environment 100 in terms of a latency in performing requests to access shared memory.

For example, considering the flow metadata of a read to write ratio for a node's shared memory can enable network controller 101 to redirect write requests to a different node to reduce the processors from stalling due to overlapping attempts to access the shared memory during stream loads to write data in the shared memory at nodes that have a higher read to write ratio. As another example, network controller 101 may collect traffic demand information, such as the flow metadata of a packet reception rate for the active nodes, and periodically aggregate the traffic demand information into a global system workload demand to adjust the resource utilization of the nodes. In some implementations, network controller 101 may adjust the resource utilization of the nodes 104 via switches in network 102 (e.g., ToR switches) that can route requests to different nodes or change the rates of dequeuing packets from Input/Output (I/O) queues of the switches to decrease or increase traffic to certain nodes 104.

In the example of FIG. 1, memory module 16A can enable OS kernel 10A to access data for the distributed memory system in shared memory 21A that is stored in kernel space 6A, as opposed to user space 8A. Data can be stored in shared memory 21A using memory module 16A to accelerate remote memory operations at a near line rate without requiring special hardware or changes to the kernel in the case where memory module 16A is an eBPF program. The remote memory operations, such as read requests and write requests, can be processed at an earlier point in the kernel, as opposed to having to traverse a full network stack and full I/O stack of the kernel to finally be handled by an application in user space 8A. For example, memory module 16A may operate at a lower block device driver layer in the I/O stack, without having to pass memory requests through higher layers in the I/O stack, such as a generic block layer and file system layer of the kernel. Similarly, memory module 16A may also operate at a lower network device driver layer in the network stack, without having to pass memory requests through higher layers of the network stack in the kernel, such as a network protocol layer and a socket layer of the kernel.

In this regard, kernel network and I/O stack processing is becoming more of a bottleneck in distributed memory systems due to faster interface standards, such as NVMe-oF, and the increasing bandwidths of network hardware. Storing data for the distributed memory in kernel space 6A and/or performing operations in kernel space 6A can enable OS kernel 10A to respond quicker on behalf of user space applications 22A. Although there is some development in allowing user space applications to bypass the kernel and have direct access to storage or memory devices, such as NVMe devices, such performance improvements will come at the cost of reimplementing complicated default kernel functions in user space. In contrast, the use of VS kernel module 12A in the kernel to generate flow metadata 23A and determine indications of queue occupancy for submission queues 19A and completion queues 20A can be performed in the kernel without requiring changes to the kernel source code or reloading a kernel module.

In the example of FIG. 1, shared memory 21A can be used by memory module 16A to share data between kernel space 6A and user space 8A. In some implementations, shared memory 21A can include one or more eBPF maps that enable copies of data to be provided to applications 22A in user space 8A and to store data from applications 22A. Shared memory 21A can include a data structure, such as a Key Value Store (KVS) or a table, for example. The use of an eBPF map as shared memory 21A can enable different applications 22A in a user space 8A to concurrently access the data stored in the shared memory.

Node 104B differs from node 104A in the example of FIG. 1 in that node 104A uses a kernel space 6B of the memory 111B of its smart NIC 108B for determining indications of queue occupancies for submission queues 19B and completion queues 20B and for generating flow metadata 23B. As shown in FIG. 1, smart NIC 108B includes its own processor 107B and memory 111B that are used as a hardware offload from processors 106B for operations related to the distributed memory system and the data accessed in shared memory 21B. This arrangement can further improve the performance of node 104B by freeing up processing resources and memory for processors 106B.

Smart NIC 108B can include, for example, an SoC that includes both processor 107B and memory 111B. In the example of node 104B, smart NIC 108B includes its own NIC OS kernel 10B that allocates resources of smart NIC 108B and memory 110B. In some implementations, memory 110B is an NVMe memory device that stores shared memory 21B for the distributed memory system in a kernel space of memory 110B and executes one or more user space applications 22B, one or more VMs 26B, and VS controller 28B in a user space of memory 110B. Each of the one or more VMs 26B can run one or more user space applications 22B and use VS controller 28B to interface with VS kernel module 12B in kernel space 6B. In addition, user space applications 22B can access user data 24B for performing tasks in the user space.

Each of NIC OS kernel 10B, VS kernel module 12B, network protocol stack 14B, memory module 16B, one or more submission queues 19B, one or more completion queues 20B, and flow metadata 23B is stored in a kernel space of memory 111B. In implementations where the NIC OS 10B is Linux, memory module 16B can include an eBPF program that is executed as an extension of the Linux kernel. As noted above, in some implementations, the generation of flow metadata 23B and determination of indications of queue occupancy for submission queues 19B and completion queues 20B can be performed by an eBPF program attached to VS kernel module 12B.

VS kernel module 12B can be used by the kernel to handle requests received from VMs 26B to communicate with other VMs either locally at node 104B or at a different node, such as node 104A. In some implementations VS kernel module 12B can include, for example, an OVS kernel module that can provide a programmable or customizable configuration in the way packets are processed and for the flow metadata generation disclosed herein. In other implementations, the flow metadata generation can be accomplished with a separate module or program in the kernel space, such as an eBPF program attached to VS kernel module 12B.

As a virtual switch, VS kernel module 12B can use flow tables (e.g., match-action tables) and perform table lookup operations in kernel space 6B according to requests received from VMs to identify different sockets or ports for routing the requests. In addition, VS kernel module 12B can generate flow metadata 23B and determine indications of queue occupancy for one or more submission queues 19B and one or more completion queues 20B. VS kernel module 12B can then provide this information to VS controller 28B in a user space to set one or more memory request rates for user space applications 22B and adjust at least one of the respective memory request rates and one or more resources allocated to the one or more user space application applications 22B.

In some implementations, VS controller 28B can include an OVS controller or agent that can provide a programmable or customizable configuration for the memory request rate setting and/or resource allocation capabilities disclosed herein. In other implementations, this can be accomplished with a separate program in the user space.

VS controller 28B may also store old flow metadata 29B in a user space of node 104B that represents previous usage of at least one resource of node 104B, such as a processor usage or usage of shared memory 21B, by one or more previous flows of packets. Old flow metadata 29B can be used to estimate a future resource utilization of at least one application, such as by considering an indication of a previous processor usage and/or memory usage by an application 22B. In response to the same application 22B becoming active again, VS controller 28B may consider the application's previous usage in adjusting one or more memory request rates and/or respective resource allocations for one or more applications.

In some implementations, VS kernel module 12B may use the transport and application layers of network protocol stack 14B to add at least one of a congestion indicator and a memory request rate set by VS controller 28B to one or more packets of at least one flow of packets. In other implementations, a program, such as an eBPF program in kernel space 6B can be attached to VS kernel module 12B to add the congestion indicator and/or the set memory request rate for one or more packets in the flow of packets. The one or more packets may then be sent to a VM executed by node 104B or by another node 104 in network 102 to adjust the memory request rate of a user space application running on the VM.

In another aspect, VS kernel module 12B or a program attached to VS kernel module 12B can add at least part of the flow metadata for a flow of packets to one or more packets in the flow that are sent to at least one of another node in network 102 and network controller 101. The flow metadata may then be collected by network controller 101 to adjust resource usage by one or more nodes 104 or applications executing at the node, such as a packet transmission rate or a memory request rate. As discussed above, network controller 101 can adjust the resource usage of the node or nodes 104 based on a global demand for accessing the distributed memory system and bottlenecks in network environment 100 in terms of a latency in performing requests to access shared memory.

Shared memory 21B can be used by memory module 16B to share data between a kernel space and a user space. In some implementations, shared memory 21B can include one or more eBPF maps that enable copies of data to be provided to applications 22B in user space and to store data from applications 22B. Shared memory 21B can include a data structure, such as a KVS or a table, for example. The use of an eBPF map as shared memory 21B can enable different applications 22B in a user space to concurrently access the data stored in the shared memory.

Those of ordinary skill in the art will appreciate with reference to the present disclosure that other implementations may include a different number or arrangement of nodes 104 than shown in the example of FIG. 1. In this regard, network environment 100 shown in FIG. 1 is for the purposes of illustration, and those of ordinary skill in the art will appreciate that network environment 100 may include many more nodes 104, and additional components, such as routers and switches, than shown in the example of FIG. 1.

In addition, those of ordinary skill in the art will appreciate with reference to the present disclosure that the modules, programs, and data structures shown in FIG. 1 may differ in other implementations. For example, node 104A or smart NIC 108B can include a different number of modules than shown in FIG. 1, such as in implementations where different programs may be used for generating flow metadata 23 and determining indications of queue occupancies for submission queues 19 and/or completion queues 20. As another example variation, each node 104 can include additional programs executed in a kernel space for performing other operations, such as computational operations for the distributed memory system like data compression, data encryption, scatter-gather operations, and/or data deduplication.

Example Processes

Figure 2:
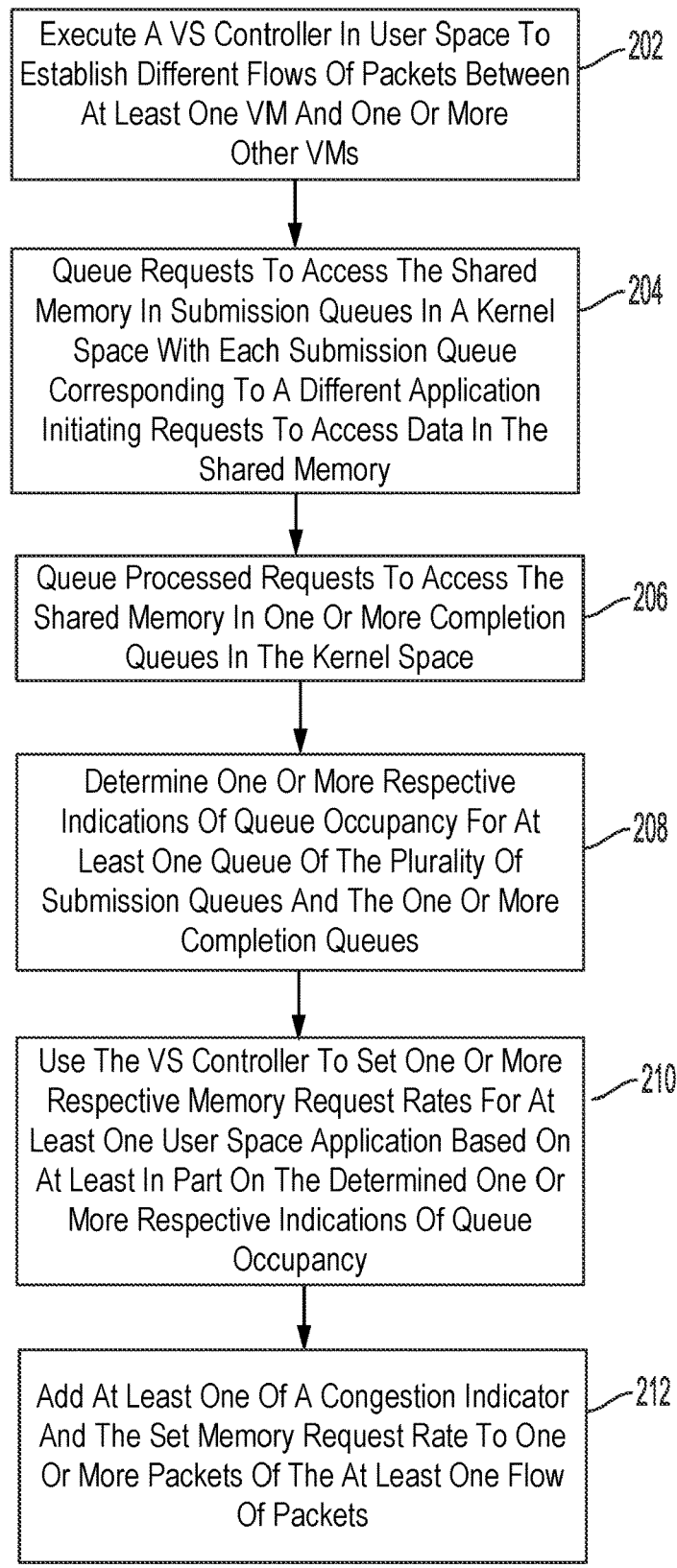
FIG. 2 is a flowchart for a memory request rate setting process according to one or more embodiments.

FIG. 2 is a flowchart for a memory request rate setting process according to one or more embodiments. The process of FIG. 2 can be performed by, for example, at least one processor 106A of node 104A in FIG. 1 executing VS kernel module 12A and VS controller 28A, or at least one processor 107B of smart NIC 108B executing VS kernel module 12B and at least one processor 106B executing VS controller 28B.

In block 202, a VS controller is executed in a user space of at least one memory of the node to establish different flows of packets between at least one VM and one or more other VMs. The VMs may be running at the same node or at a different node or may include a mix of VMs running at the local node and at a remote node. The flows of packets can be initiated by user space applications running in a VM at the node or may be initiated by one or more user space applications running in a VM at a different node in the network.

In block 204, requests to access a shared memory of the node are queued in a plurality of submission queues in a kernel space of at least one memory of the node. Each submission queue can correspond to a different application initiating requests to access data in the shared memory. In some implementations, the requests to access the shared memory can include NVMe read commands and NVMe write commands. In addition, the packets can be received by a VS kernel module in the kernel space that can parse the packets to identify the requests, such as by identifying an NVMe header and an opcode indicating that the packet includes a request to access the shared memory. The VS kernel module may then place the request in a corresponding submission queue based on an application or flow identifier, such as a socket ID and/or port number used by the application.

In block 206, processed requests from accessing the shared memory are queued in one or more completion queues in the kernel space. In some implementations, this queuing may be performed by a VS kernel module and may also be sorted by application or flow. In other implementations, the completion queues may not be sorted by application or flow or may instead be sorted by completed read requests and completed write requests.

In block 208, the VS kernel module determines one or more respective indications of queue occupancy for at least one queue of the plurality of submission queues and the one or more completion queues. The indications of queue occupancy can include, for example, a number of requests or processed requests in each queue or may include a value indicating a relative level of pending requests or processed requests in each queue (e.g., low, medium, or high).

In some implementations, the VS kernel module may determine different respective queue occupancies for different submission queues corresponding to different applications or flows of packets and store the different queue occupancies as part of a flow metadata in the kernel space. The VS kernel module may also determine one or more indications of a queue occupancy or queue occupancies for the completion queue or completion queues. In other implementations, the VS kernel module may determine an overall queue occupancy indication for the submission queues and/or the completion queues.

The indications of the queue occupancy or queue occupancies can represent a usage of the shared memory by one or more applications executing in a user space at the node and/or at a remote node. In the case where separate indications of queue occupancy for each submission queue are determined, such indications can represent the relative usage of the shared memory by the different user space applications. The VS kernel module may also sum the queue occupancies to provide an overall indication of memory usage. A comparison of the completion queue occupancy to the submission queue occupancy can also provide an indication of throughput for processing memory requests.

In block 210, the VS controller in the user space sets one or more respective memory request rates for at least one user space application based at least in part on the determined one or more indications of queue occupancy. The VS kernel module in the kernel space can communicate with the VS controller in the user space to provide the VS controller with updated indications of queue occupancy. In other implementations, the VS controller may access the indications of queue occupancy directly in the kernel.

In one example, the VS controller may lower a memory request rate for an application that has a submission queue and a completion queue in the kernel with high levels of pending requests and processed requests and raise the memory request rate for another application that has a high level of pending requests in its submission queue but a low level of processed requests in its completion queue. As another example, the VS controller may lower the memory request rates of multiple applications when an overall queue occupancy for all the submission queues is indicated to be at a high level. The memory request rates may then be increased when an overall indication of queue occupancy falls to a lower level.

In block 212, the VS kernel module can add at least one of a congestion indicator and a memory request rate set by the VS controller to one or more packets of at least one flow of packets. In some implementations, the congestion indicator can be a field in the packet or packets indicating a level of pending requests in the submission queues. In other implementations, the congestion indicator can represent a packet reception rate by the node via its network interface.

The addition of the memory request rate to the packet or packet may also be a separate field in the packet that can then be used by a receiving node via the network to adjust a memory request rate of a user space application running on a VM at the remote node. In some implementations, the VS controller may provide the VS kernel module with an indication of the set memory request rate for an application executed at a remote node. The VS kernel module may then add the set memory request rate to a field in one or more outgoing packets to the remote node.

The foregoing memory request rate setting process of FIG. 2 based on the submission queues and/or completion queues to access the shared memory can improve the resource allocation at the node to provide a more balanced access of the shared memory by different applications.

Those of ordinary skill in the art will appreciate with reference to the present disclosure that other implementations of the memory request rate setting process of FIG. 2 may differ. For example, block 212 to add at least one of a congestion indicator and a set memory request rate may be omitted in some cases where the user space applications generating the requests for the queues are all executed at the local node. As another example, the execution of the VS controller in block 202 may be concurrent with the performance of blocks 204 to 212.

Figure 3:
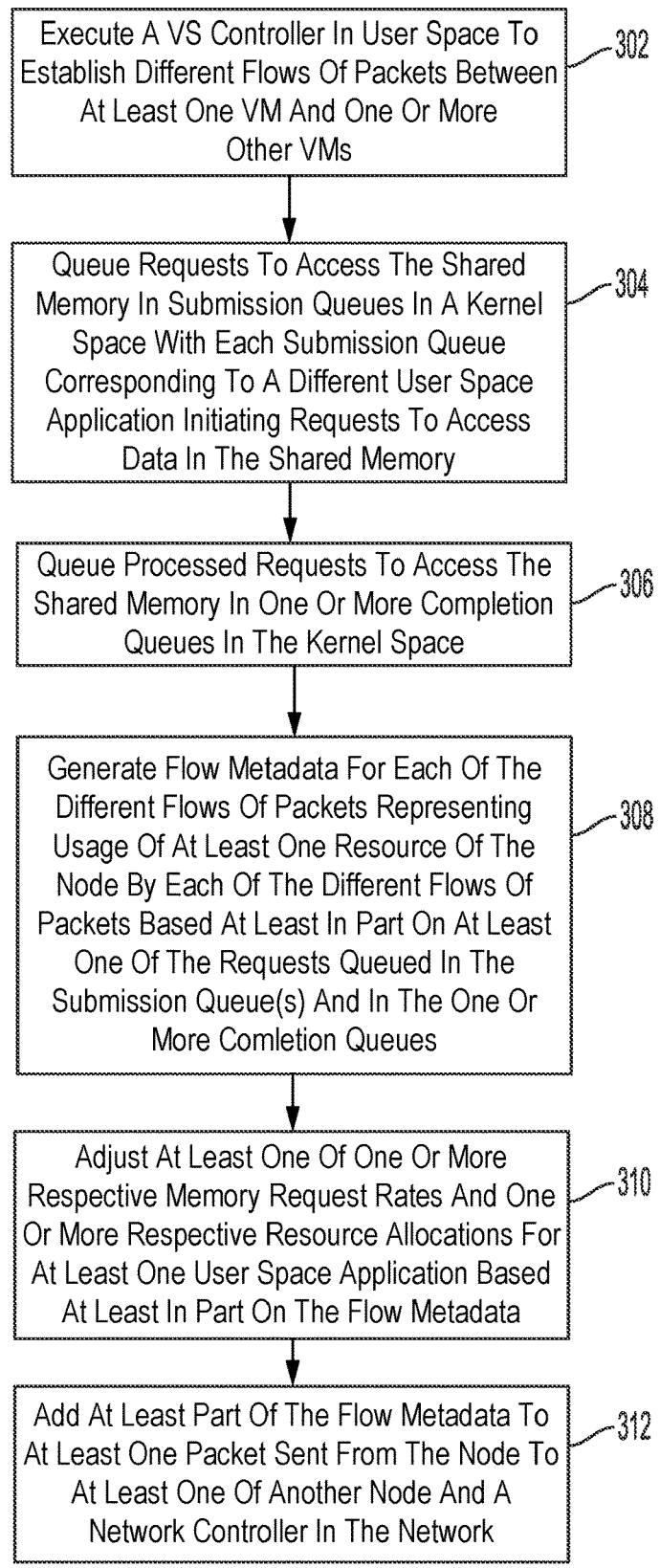
FIG. 3 is a flowchart for a resource allocation adjustment process according to one or more embodiments.

FIG. 3 is a flowchart for a resource allocation adjustment process according to one or more embodiments. The process of FIG. 3 can be performed by, for example, at least one processor 106A of node 104A in FIG. 1 executing VS kernel module 12A and VS controller 28A, or at least one processor 107B of smart NIC 108B executing VS kernel module 12B and at least one processor 106B executing VS controller 28B.

In block 302, a VS controller is executed in a user space of at least one memory of the node to establish different flows of packets between at least one VM and one or more other VMs. The VMs may be running at the same node or at a different node or may include a mix of VMs running at the local node and at a remote node. The flows of packets can be initiated by user space applications running in a VM at the node or may be initiated by one or more user space applications running in a VM at a different node in the network.

In block 304, requests to access a shared memory of the node are queued in a plurality of submission queues in a kernel space of at least one memory of the node. Each submission queue can correspond to a different application initiating requests to access data in the shared memory. In some implementations, the requests to access the shared memory can include NVMe read commands and NVMe write commands. In addition, the packets can be received by a VS kernel module in the kernel space that can parse the packets to identify the requests, such as by identifying an NVMe header and an opcode indicating that the packet includes a request to access the shared memory. The VS kernel module may then place the request in a corresponding submission queue based on an application or flow identifier, such as a socket ID and/or port number used by the application.

In block 306, processed requests from accessing the shared memory are queued in one or more completion queues in the kernel space. In some implementations, this queuing may be performed by a VS kernel module and may also be sorted by application or flow. In other implementations, the completion queues may not be sorted by application or flow or may instead be sorted by completed read requests and completed write requests.

In block 308, the VS kernel module generates flow metadata for each of the different flows of packets that represents usage of at least one resource of the node by each of the different flows' packets based at least in part on at least one of the requests queued in the submission queues and the processed requests in one or more completion queues. The flow metadata can represent, for example, at least one of a read request frequency for requests to read data from the shared memory, a write request frequency of requests to write data in the shared memory, a read to write ratio of reading data from the shared memory to writing data in the shared memory, a usage of an amount of the shared memory, a usage of at least one processor of the node, a packet reception rate by the node, and at least one indication of queue occupancy for a corresponding submission queue and a corresponding completion queue for requests from the flow of packets. In some implementations, the flow metadata may be stored as part of flow tables used by the VS kernel module or may be stored in a separate data structure in the kernel space.

In block 310, the VS controller adjusts at least one of one or more respective memory request rates and one or more respective resource allocations for at least one user space application based at least in part on the flow metadata generated in block 308. In some implementations, the VS kernel module may provide flow metadata stored in the kernel space to the VS controller in the user space. In other implementations, the VS controller may access the flow metadata in the kernel space.

The memory request rates may have been previously set by the VS controller based on indications of queue occupancy for one or more submission queues and/or completion queues, as in the example process of FIG. 2. Other examples of adjustments to resource allocations other than the memory request rates can include, for example, a scheduling for tasks of one or more user space applications on a VM, creation of a certain number of submission queues for an application to access the shared memory, using a dequeuing frequency or setting a number of requests dequeued for an application from one or more submission queues and/or completion queues, or a network bandwidth allocated to an application, such as with the allocation of one or more VS packet queues for the application or a dequeuing policy for such queues.

In block 312, the VS kernel module adds at least part of the flow metadata to at least one packet sent from the node to at least one of another node in the network and a network controller. Such flow metadata can be collected by the network controller and used to update a global system workload demand and adjust the utilization of different nodes, such as through ToR switches that can direct memory requests to different nodes. In some cases, an intermediate switch or the remote node receiving the at least one packet may forward the flow metadata to the network controller.

The foregoing resource allocation adjustment process of FIG. 3 based on flow metadata can improve the resource allocation at the node to provide a more balanced access of the shared memory by the different applications and can help ensure that different requirements for the application, such as different latency requirements or Quality of Service (QoS) requirements, are met.

Those of ordinary skill in the art will appreciate with reference to the present disclosure that other implementations of the resource allocation adjustment process of FIG. 3 may differ. For example, block 312 to add at least part of the flow metadata to outgoing packets may be omitted in implementations where the network controller may instead request the flow metadata directly from the node. As another example, the execution of the VS controller in block 302 may be concurrent with the performance of blocks 304 to 312.

Figure 4:
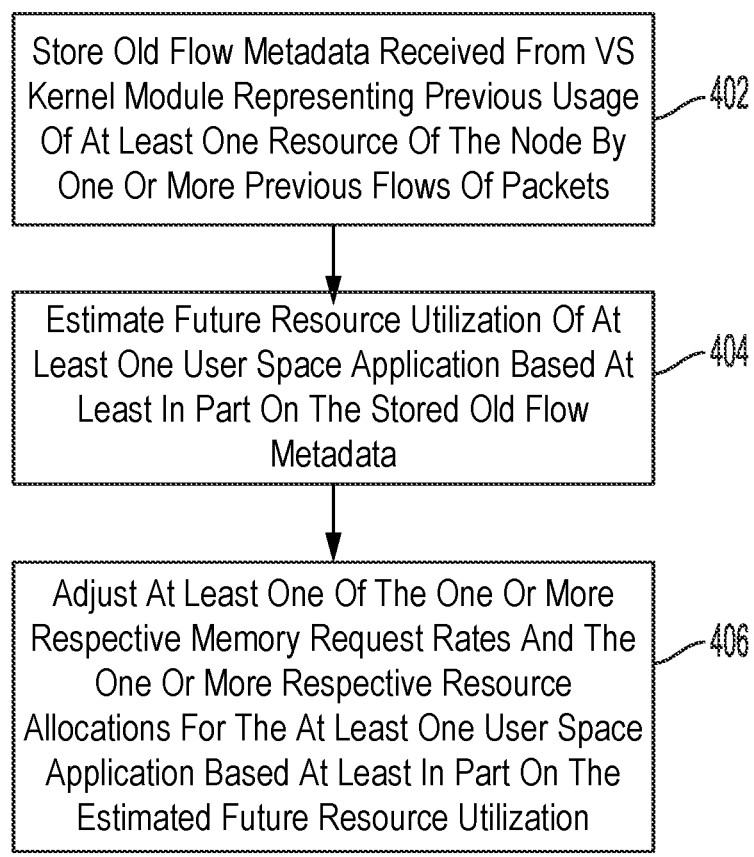
FIG. 4 is a flowchart for a resource utilization estimation process according to one or more embodiments.

FIG. 4 is a flowchart for a resource utilization estimation process according to one or more embodiments. The process of FIG. 4 can be performed by, for example, at least one processor 106A of node 104A in FIG. 1 executing VS controller 28A, or by at least one processor 106B of node 104B executing VS controller 28B.

In block 402, the VS controller stores old flow metadata received from the VS kernel module representing previous usage of at least one resource of the node by one or more previous flows of packets. The old flow metadata may be stored in a user space or in a kernel space of at least one memory of the node. In some implementations, the old flow metadata can be organized by user space application that initiated the previous flow or flows.

In block 404, the VS controller estimates a future resource utilization of at least one user space application based at least in part on the stored old flow metadata. The future resource utilization can include, for example, a usage of the shared memory or a usage of a processor, such as for an application that previously performed a large number of calculations consuming a certain amount of processor time. The estimated future resource utilization can be based at least in part on old flow metadata for the application or flow, such as, at least one of a read request frequency of requests to read data from the shared memory, a write request frequency of requests to write data in the shared memory, a read to write ratio of reading data from the shared memory to writing data in the shared memory, a usage of an amount of the shared memory, a usage of at least one processor of the node, a packet reception rate by the node, and at least one indication of queue occupancy for a corresponding submission queue and a corresponding completion queue for requests from the previous flow of packets.

In block 406, the VS controller adjusts at least one of the one or more respective memory request rates and the one or more respective resource allocations for at least one user space application based at least in part on the estimated future resource utilization in block 404. For example, an indication of a previous processor usage and/or memory usage of an application may be included in the old flow metadata. In response to the same application initiating a new flow, the VS controller can consider the application's previous usage and adjust one or more memory request rates and/or respective resource allocations for one or more running applications. In this regard, an application that previously had a high memory request rate can cause the VS controller to lower the memory request rates of other applications in anticipation of a higher number of requests for a new flow initiated by the application.

Those of ordinary skill in the art will appreciate with reference to the present disclosure that the resource utilization adjustment process of FIG. 4 may be performed in a different order. For example, the performance of blocks 402, 404, and/or 406 may overlap as future resource utilizations for applications that begin a new flow are estimated in block 404, while old flow metadata may be stored for a previous flow in block 402, and one or more memory request rates are adjusted in block 406 based at least in part on a future resource utilization estimated for a different application or flow.

The foregoing resource allocation adjustment and memory request rate setting processes based on submission queues and/or completion queues to access a shared memory can improve the usage of the shared memory and other resources of the node, such as processor scheduling. In addition, flow metadata that is generated by a VS kernel module can be used to better balance resources among applications throughout the distributed memory system.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A node, comprising:
   at least one memory configured to be used at least in part as a shared memory shared by a plurality of user space applications in a distributed memory system in a network;
   a network interface configured to communicate with one or more other nodes in the network; and
   at least one processor configured, individually or in combination, to:
      execute a Virtual Switching (VS) controller in a user space of the at least one memory, the VS controller configured to route a flow of packets between a Virtual Machine (VM) on the node and a different VM on the node or on a different node of the one or more other nodes, wherein the flow of packets is initiated by a user space application executed by the VM and includes at least one memory request to access the shared memory; and
      execute at least one module in a kernel space of the at least one memory, the at least one module configured, individually or in combination, to:
         queue memory requests to access the shared memory in a plurality of submission queues in the kernel space, wherein each submission queue of the plurality of submission queues corresponds to a different user space application initiating requests to access data in the shared memory;
         queue processed memory requests to access the shared memory in one or more completion queues in the kernel space; and
         provide one or more respective indications of queue occupancy for at least one queue of the plurality of submission queues and the one or more completion queues; and
      wherein during the execution of the user space application, the user space application transmits the at least one memory request according to a memory request rate that is based at least in part on the one or more respective indications of queue occupancy for the at least one queue.

2. The node of claim 1, wherein the at least one processor is further configured, individually or in combination, to execute a VS kernel module in the kernel space to provide the one or more respective indications of queue occupancy.

3. The node of claim 1, wherein the at least one processor is further configured, individually or in combination, to execute a VS kernel module in the kernel space, the VS kernel module configured to, based on the memory request rate, add at least one of a congestion indicator and the memory request rate to one or more packets of the flow of packets.

4. The node of claim 1, wherein the at least one processor is further configured, individually or in combination, to generate flow metadata for the flow of packets representing at least one of:
   a read request frequency of memory requests to read data from the shared memory,
   a write request frequency of memory requests to write data in the shared memory,
   a read to write ratio of reading data from the shared memory to writing data in the shared memory,
   a usage of an amount of the shared memory,
   a usage of the at least one processor,
   a packet reception rate, and
   at least one indication of queue occupancy for a corresponding submission queue and a corresponding completion queue for the flow of packets.

5. The node of claim 4, wherein the at least one processor is further configured, individually or in combination, to add at least part of the flow metadata to at least one packet sent from the node to at least one of a node of the one or more other nodes and a network controller in the network,
   wherein a resource usage of a plurality of nodes in the network is based at least in part on the flow metadata added to the at least one packet.

6. The node of claim 1, wherein the VS controller is further configured to:
   receive flow metadata from a VS kernel module in the kernel space representing usage of at least one resource of the node by different flows of packets initiated by at least one user space application, wherein
   at least one of one or more respective memory request rates and one or more respective resource allocations for the at least one user space application is based at least in part on the received flow metadata.

7. The node of claim 1, wherein the VS controller is further configured to:
store old flow metadata received from a VS kernel module in the kernel space representing previous usage of at least one resource of the node by one or more previous flows of packets, wherein the memory request rate and a resource allocation for the user space application is based at least in part on an estimated future resource utilization of the user space application, and wherein the estimated future resource utilization is
based at least in part on the stored old flow metadata.

8. The node of claim 1, wherein the plurality of submission queues includes Non-Volatile Memory express (NVMe) submission queues to access the shared memory.

9. The node of claim 1, wherein a processor of the network interface is configured to:
provide the one or more respective indications of queue occupancy for the at least one queue of the plurality of submission queues and the one or more completion queues; and
send the one or more respective indications of queue occupancy to a different processor of the at least one processor that is configured to execute the VS controller.

10. A method, comprising:
executing a Virtual Switching (VS) controller in a user space of at least one memory of a node having at least one processor, the VS controller configured to establish different flows of packets between at least one Virtual Machine (VM) on the node and one or more other VMs on the node or on one or more other nodes in communication with the node via a network, wherein the different flows of packets include a plurality of memory requests of at least one user space application executing on at least one of the at least one VM and the one or more other VMs;
queuing memory requests from user space applications to access a shared memory of the at least one memory of the node in a plurality of submission queues in a kernel space of the at least one memory, wherein each submission queue of the plurality of submission queues corresponds to a different user space application initiating respective memory requests to access data in the shared memory;
queuing processed memory requests to access the shared memory in one or more completion queues in the kernel space;
based at least in part on at least one of the memory requests queued in the plurality of submission queues and the processed memory requests queued in the one or more completion queues, generating flow metadata for each of the different flows of packets, the flow metadata representing usage of at least one resource of the node by each of the different flows of packets; and
executing a user space application of the at least one user space application based at least in part on the generated flow metadata, wherein at least one of a memory request rate and one or more resource allocations for the user space application is based at least in part on the generated flow metadata.

11. The method of claim 10, further comprising:
providing one or more respective indications of queue occupancy for at least one queue of the plurality of submission queues and the one or more completion queues; and
wherein the flow metadata is based at least in part on the one or more respective indications of queue occupancy for the at least one queue.

12. The method of claim 10, wherein the flow metadata for each of the different flows of packets represents at least one of:
a read request frequency of memory requests to read data from the shared memory,
a write request frequency of memory requests to write data in the shared memory,
a read to write ratio of reading data from the shared memory to writing data in the shared memory,
a usage of an amount of the shared memory,
a usage of the at least one processor,
a packet reception rate,
an indication of the number of memory requests queued in at least one submission queue of the plurality of submission queues, and
at least one indication of queue occupancy for a corresponding submission queue and a corresponding completion queue for the flow of packets.

13. The method of claim 10, further comprising:
executing a VS kernel module in the kernel space of the at least one memory; and
using the VS kernel module to generate the flow metadata for the different flows of packets.

14. The method of claim 10, further comprising:
adding at least part of the flow metadata to at least one packet sent from the node to at least one of a node of the one or more other nodes in the network and a network controller in the network,
wherein a resource usage of a plurality of nodes in the network is based at least in part on the flow metadata added to the at least one packet.

15. The method of claim 10, further comprising:
storing old flow metadata received from a VS kernel module in the kernel space representing previous usage of at least one resource of the node by one or more previous flows of packets, wherein at least one of the memory request rate and a resource allocation for the user space application is based at least in part on an estimated future resource utilization of the user space application, and wherein the estimated future resource utilization is
based at least in part on the stored old flow metadata.

16. The method of claim 10, wherein the plurality of submission queues includes Non-Volatile Memory express (NVMe) submission queues to access the shared memory.

17. The method of claim 10, further comprising:
using a processor of a network interface of the node to provide one or more respective indications of queue occupancy for at least one queue of the plurality of submission queues and the one or more completion queues; and
sending the one or more respective indications of queue occupancy to a different processor of the at least one processor that is configured to execute the VS controller.

18. A node, comprising:
at least one memory configured to be used at least in part as a shared memory shared by a plurality of user space applications in a distributed memory system in a network;
a network interface configured to communicate with one or more other nodes in the network;
a user space means for executing a Virtual Switch (VS) controller in a user space of the at least one memory, the VS controller configured to route a flow of packets between a Virtual Machine (VM) on the node and a different VM on the node or on a different node of the one or more other nodes, wherein the flow of packets is initiated by a user space application executed by the VM and includes at least one memory request to access the shared memory; and a kernel space means for:
  queuing memory requests to access the shared memory in a plurality of submission queues in a kernel space of the at least one memory, wherein each submission queue of the plurality of submission queues corresponds to a different user space application initiating requests to access data in the shared memory;
  queuing processed memory requests to access the shared memory in one or more completion queues in the kernel space; and
  providing one or more respective indications of queue occupancy for at least one queue of the plurality of submission queues and the one or more completion queues; and
wherein during the execution of the user space application, the user space application transmits the at least one memory request according to a memory request rate that is based at least in part on the one or more respective indications of queue occupancy for the at least one queue.

19. The node of claim 18, wherein the kernel space means is further for, based at least in part on at least one of the memory requests queued in the plurality of submission queues and the processed memory requests queued in the one or more completion queues, generating flow metadata for different flows of packets representing usage of at least one resource of the node by each of the different flows of packets initiated by at least one user space application,
  wherein at least one of one or more respective memory request rates and one or more respective resource allocations for the at least one user space application is based at least in part on the generated flow metadata.

20. The node of claim 18, wherein the kernel space means is further for executing a VS kernel module in the kernel space, the VS kernel module configured to, based on the memory request rate, add at least one of a congestion indicator and the memory request rate to one or more packets of at least one flow of packets.

* * * * *